J. McMURTRY.

Cotton-Bale Ties.

No. 5,457. Reissued June 17, 1873.

Attest
A. Campbell
Charles H. Smith.

Inventor
John McMurtry

AM. PHOTO-LITHOGRAPHIC CO. N.Y. (OSBORNE'S PROCESS.)

UNITED STATES PATENT OFFICE.

JOHN McMURTRY, OF FAYETTE COUNTY, KENTUCKY, ASSIGNOR, BY MESNE ASSIGNMENTS, TO FREDERIC COOK, OF NEW ORLEANS, LOUISIANA.

IMPROVEMENT IN COTTON-BALE TIES.

Specification forming part of Letters Patent No. 27,866, dated April 10, 1860; reissue No. 5,457, dated June 17, 1873; application filed June 2, 1873.

*To all whom it may concern:*

Be it known that I, JOHN McMURTRY, of Fayette county, Kentucky, have invented an Improved Mode of Securing Metal Hoops on Cotton-Bales, of which the following is a specification:

My invention relates to a new and useful mode of making fastenings or ties upon metal hoops or bands for cooperage, and the baling of cotton, hemp, &c.; and consists in so hooking or looping the ends of metallic bands into each other that they will be securely fastened without the employment of an intermediate buckle or link.

My invention, in the form in which I have preferred to embody it, may be thus described with the aid of the accompanying drawings.

Figure 1:
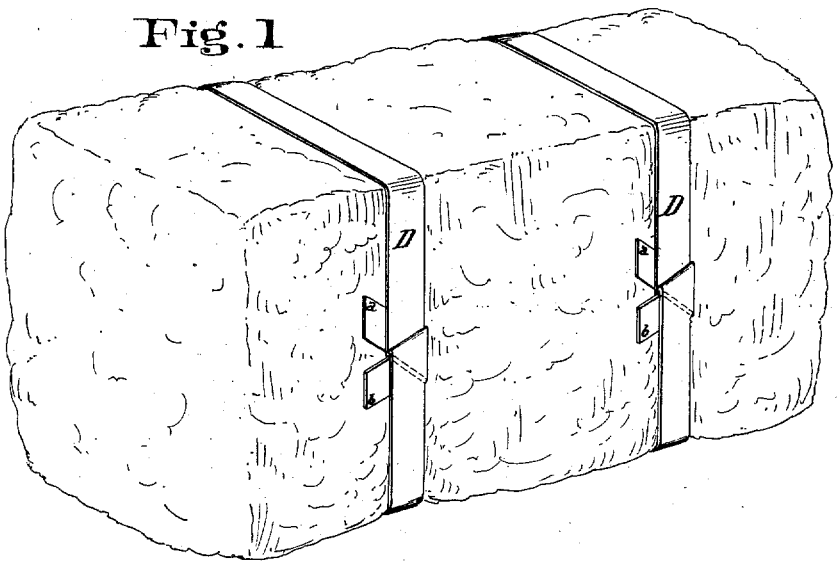
Figure 2:
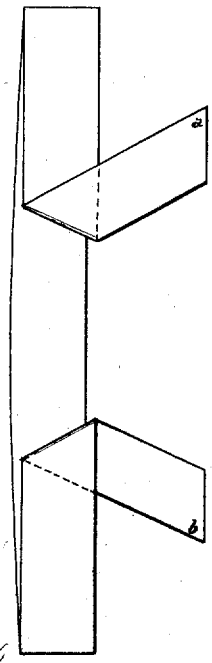
Figure 3:
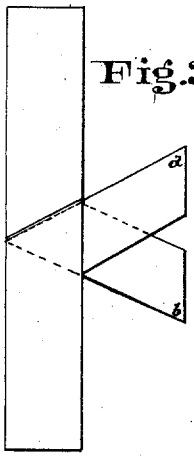

I bend or loop the ends of the hoop or band at an angle of sixty degrees, as shown in Figure 2. I then hook the ends together, as shown in Fig. 3. I then bend both ends under beneath the body of the hoop or band, or between it and the bale, as shown in Fig. 1, thus forming a secure and strong fastening.

The object in making the loops upon the ends of the hoops or bands at an angle of sixty degrees is to bring the sides of the hoops, when the attachment is made, in line with each other without the necessity of trimming the ends of the hoops.

What I claim as my invention is—

1. The attachment of the ends of metallic bands by locking the same together, and bending the surplus ends beneath the body of the bands, as shown.

2. Uniting the ends of iron bands for baling purposes by attaching the same together by hooks formed on one or both of said bands without the interposition of a link or buckle.

3. A tie, formed by hooking or looping the ends of metallic bands into each other without the interposition of a link.

FREDERIC COOK.

Witnesses
JOHN E. HATCH,
CHARLES H. SMITH.